United States Patent
Kozloski et al.

(10) Patent No.: US 9,633,538 B1
(45) Date of Patent: Apr. 25, 2017

(54) SYSTEM AND METHOD FOR WEARABLE INDICATION OF PERSONAL RISK WITHIN A WORKPLACE

(71) Applicant: INTERNATIONAL BUSINESS MACHINES CORPORATION, Armonk, NY (US)

(72) Inventors: James R. Kozloski, New Fairfield, CT (US); Timothy M. Lynar, Kew (AU); Jorge A. M. Ortiz, Carlton (AU); John M. Wagner, Carlton (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/964,238

(22) Filed: Dec. 9, 2015

(51) Int. Cl.
  *G06K 7/01* (2006.01)
  *G08B 21/02* (2006.01)
  *G06N 99/00* (2010.01)

(52) U.S. Cl.
  CPC ........... *G08B 21/02* (2013.01); *G06N 99/005* (2013.01)

(58) Field of Classification Search
  CPC ....................................................... G08B 21/02
  USPC .................................. 340/539.11, 573.1, 575
  See application file for complete search history.

(56) References Cited

U.S. PATENT DOCUMENTS

| | | | |
|---|---|---|---|
| 5,796,341 A * | 8/1998 | Stratiotis | F16P 1/00 307/326 |
| 6,798,392 B2 | 9/2004 | Hartwell | |
| 7,918,887 B2 | 4/2011 | Roche | |
| 8,514,087 B2 | 8/2013 | Little | |
| 2007/0063858 A1* | 3/2007 | Lee | G08B 21/12 340/632 |
| 2008/0116274 A1* | 5/2008 | Aldridge | D06F 93/00 235/440 |
| 2008/0302360 A1* | 12/2008 | Chambers | A62B 9/02 128/202.13 |
| 2009/0124870 A1 | 5/2009 | Arends | |
| 2011/0133927 A1* | 6/2011 | Humphrey | A62B 9/006 340/539.11 |
| 2012/0268277 A1 | 10/2012 | Best | |

(Continued)

FOREIGN PATENT DOCUMENTS

| | | |
|---|---|---|
| CN | 203555225 | 4/2014 |
| JP | 2003305026 | 10/2003 |

OTHER PUBLICATIONS

Qiang Cheng, ZigBee Based Intelligent Helmet for Coal Miners, Computer Science and Information Engineering, 2009 WRI World Congress on (vol. 3), Mar. 31, 2009-Apr. 2, 2009, pp. 433-435.

(Continued)

*Primary Examiner* — Brent Swarthout
(74) *Attorney, Agent, or Firm* — Tutunjian & Bitetto, P.C.; Alexa Ashworth

(57) ABSTRACT

Described herein is a method for alerting of personal risk in the workplace through a wearable indication signifying a risk condition that includes generating a set of workplace predictors of risk relating to accidents, injury, and industrial hygiene, based on at least one worker state that includes at least one of a physical state, a cognitive state, and an emotional state, and alerting a worker endangered by a predicted elevated risk to the existence of the predicted elevated risk by sending a perceivable alert to the worker. A system for alerting of personal workplace risk is also described.

20 Claims, 6 Drawing Sheets

(56) References Cited

U.S. PATENT DOCUMENTS

| | | | |
|---|---|---|---|
| 2013/0217352 A1 | 8/2013 | Pan | |
| 2014/0184392 A1* | 7/2014 | Weiss | G06K 19/0723 340/10.51 |
| 2014/0342758 A1* | 11/2014 | Aleksy | H04M 1/72569 455/456.3 |
| 2015/0027808 A1* | 1/2015 | Baillargeon | B66F 17/006 182/3 |
| 2015/0032021 A1 | 1/2015 | Chen | |

OTHER PUBLICATIONS

R.W. Picard, Affective Wearables, Wearable Computers, 1997. Digest of Papers., First International Symposium on Wearable Computers, Oct. 13-14, 1997, pp. 90-97.

Rosalind W. Picard, Toward Machine Emotional Intelligence: Analysis of Affective Physiological State, Pattern Analysis and Machine Intelligence, IEEE Transactions on (vol. 23, Issue: 10), Oct. 2001, pp. 1175-1191.

Cornelia Setz, Discriminating Stress From Cognitive Load Using a Wearable EDA Device, IEEE Transactions on Information Technology in Biomedicine, vol. 14, No. 2, Mar. 2010, pp. 410-417.

Samuel Melamed, Adverse Work and Environmental Conditions Predict Occupational Injuries the Israeli Cardiovascular Occupational Risk Factors Determination in Israel (CORDIS) Study, Am J Epidemiol. Jul. 1, 1999;150 (1):18-26.

Christian Peter, A Wearable Multi-sensor System for Mobile Acquisition of Emotion-Related Physiological Data, Affective Computing and Intelligent Interaction, First International Conference, ACII 2005, Beijing, China, Oct. 22-24, 2005.

Kyle Steenland, Dying for Work: The Magnitude of US Mortality From Selected Causes of Death Associated With Occupation, American Journal of Industrial Medicine, 43:461-482 (2003).

National Safety Council Injury Facts, 2013 Edition.

* cited by examiner

SYSTEM AND METHOD FOR WEARABLE INDICATION OF PERSONAL RISK WITHIN A WORKPLACE

BACKGROUND

Technical Field

The present invention generally relates to a system and method for processing information for purpose of maintaining a safe working environment through the assessment of risk factors pertaining to workplace hygiene and worker injury, and actions taken on the basis of same.

Description of the Related Art

Factors such as workplace training, other forms of workplace education, and the experience accrued by each individual worker contribute to a worker's individual assessment of workplace risks and dangers. For example, with regard to the operation of a workplace machine, the worker might consider his or her level of experience in deciding whether to operate the machine, whether to not operate the machine, or whether to only operate it with the assistance of another experienced worker. The worker might account for the distance to keep from the machine during its operation, and other factors such as what is a safe or unsafe location to be in during machine operation. Other considerations include what operation procedures are acceptable or unacceptable. However, due to a number of factors, worker self-assessment of risk has its limitations and often is not a sufficient preventer or deterrent of a workplace accident that could lead to injury.

SUMMARY

In accordance with present principles, described is a method for alerting of personal risk in the workplace through a worker-wearable indicator of a risk condition. The method includes generating, in computer memory, a set of workplace predictors of risk relating to accidents, injury, and industrial hygiene events. The set of workplace predictors are based on one or more worker states that include physical states, cognitive states, and emotional states. Through the compiling a sequence of states that are predictive of an elevated risk of an industrial hygiene or workplace injury event, the set of workplace predictors are used to predict an elevated risk condition endangering a worker, and the worker is alerted to the existence of the risk by sending a perceivable alert to the worker.

Further in accordance with present principles, described is a system for alerting of personal risk in the workplace through a worker-wearable indicator of a risk condition. The system includes one or more servers having a processor and a workplace hygiene and injury predictor that predicts a risk of accidents, injury, and industrial hygiene events in the workplace through consideration of categorized information on worker states obtained by unsupervised learning and supervised learning. The system further includes an elevated risk determiner that determines the existence of a predicted risk of an accident, injury, and industrial hygiene event and a worker warning manager that transmits a signal directed to a worker exposed to a predicted elevated risk. The signal is translated into a perceivable alert by a wearable risk indicator worn by the worker.

Still further in accordance with present principles, described is a computer program product alerting of personal risk in the workplace through a worker-wearable indicator of a risk condition, the computer program product comprising a non-transitory computer readable storage medium having program instructions embodied therewith. The computer-executable program instructions cause the computer to perform a method that includes generating a set of workplace predictors of risk relating to accidents, injury, and industrial hygiene events. The set of workplace predictors are based on one or more worker states that include physical states, cognitive states, and emotional states. Through the compiling a sequence of states that are predictive of an elevated risk of an industrial hygiene or workplace injury event, the set of workplace predictors are used to predict an elevated risk condition endangering a worker, and the worker is alerted to the existence of the risk by sending a perceivable alert to the worker.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

The present principles are directed to systems and methods for providing wearable indication of a risk or danger of workplace injury as a result of accident or deteriorating workplace hygiene. The risk is assessed based on information collected about worker states. Implementation of the system and method is intended to prevent injuries caused by the risk through the activation of a wearable indicator that is worn by a worker or group of workers. The indicator is perceivable by the human senses. It may be a visual indication, such as emitted light, it may be a sound, such as an alarm or spoken words of instruction, or it may be something tactile, that is, perceivable by touch, such as a vibration. Combinations are also possible.

It is believed that with practice of the system and method according to present principles that the number of fatal and non-fatal workplace injuries can be reduced, as should be apparent from the disclosure that follows.

The system contemplates the collection of data concerning the risk behaviors of individual workers and the activities those individuals are engaged in, such as machine operations. Such information is useful for building risk profiles for individual workers, and profiles relating to the use of the machines. The collected information is also useful when educating and training workers.

In one embodiment, the present principles are utilized with respect to a cloud deployable cognitive suite of workplace hygiene and injury predictors, abbreviated as Cognitive WHIP. In another embodiment, the present principles provide a system and method in which Cognitive WHIP predicts that an accident event is imminent due to an increased risk of an accident in the workplace, with the prediction having basis in models and predictions that account for the individual workers in the workplace, the machinery and other equipment in use, and the issuance of a perceivable warning signal to a worker or group of workers through indicators worn by those persons.

Figure 1:
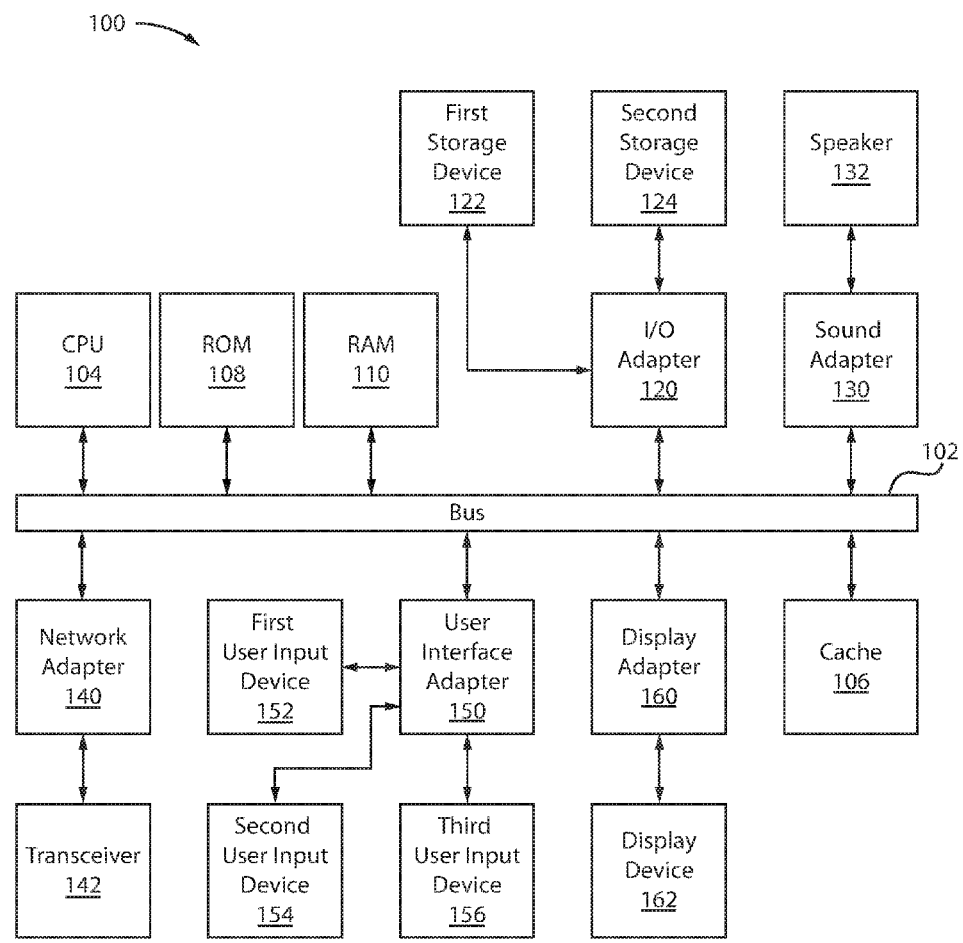
FIG. 1 shows an exemplary processing system to which the present principles may be applied in accordance with an embodiment of the present principles.

Referring to FIG. 1, an exemplary processing system 100 to which the present principles may be applied is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154 and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

The processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. It is to be appreciated that the terms processors and controllers can be used interchangeably herein. These and other variations of the processing system 100 are readily contemplated by one of ordinary skill in the art given the teachings of the present principles provided herein.

Figure 2:
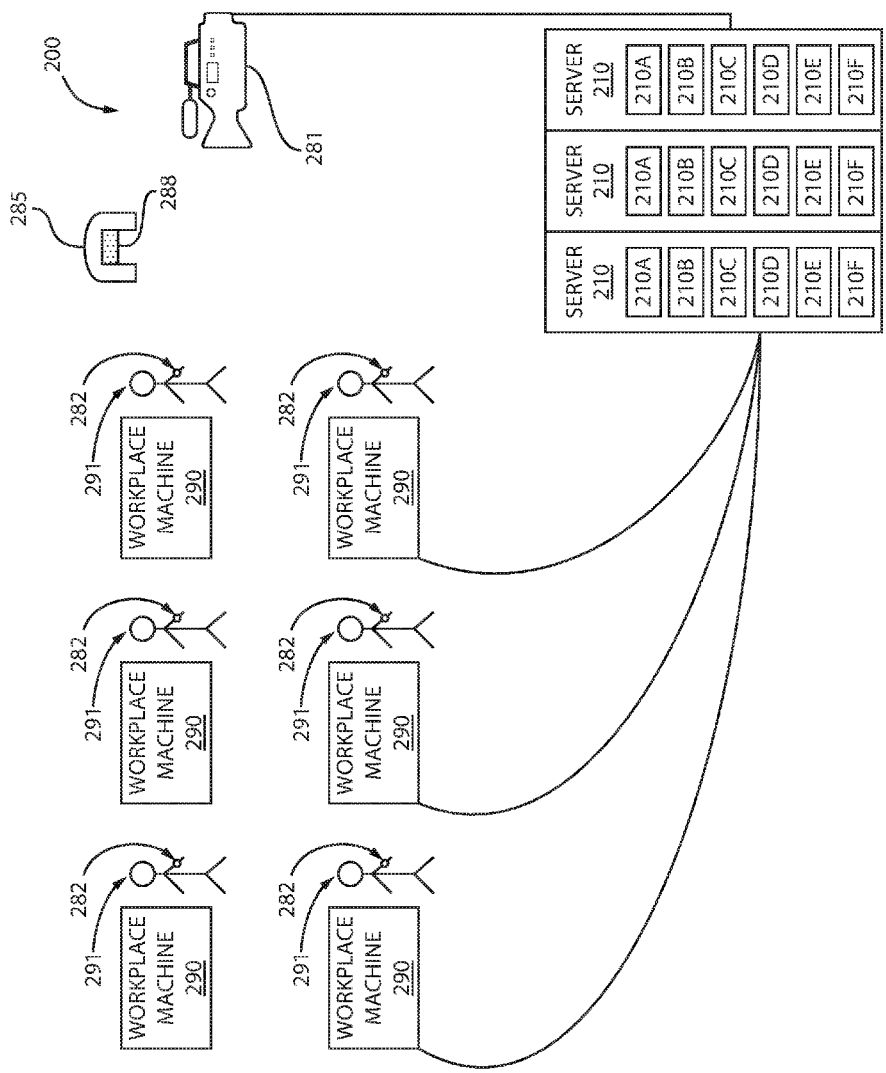
FIG. 2 shows an exemplary system of assessing risk, providing wearable indication of risk, and transmission of a signal warning the worker or workers of a possible injury risk situation, in accordance with an embodiment of the present principles.

Referring to FIG. 2, system 200 for implementing respective embodiments of the present principles is shown. Part or all of processing system 100 may be implemented in one or more of the elements of system 200.

Figure 3:
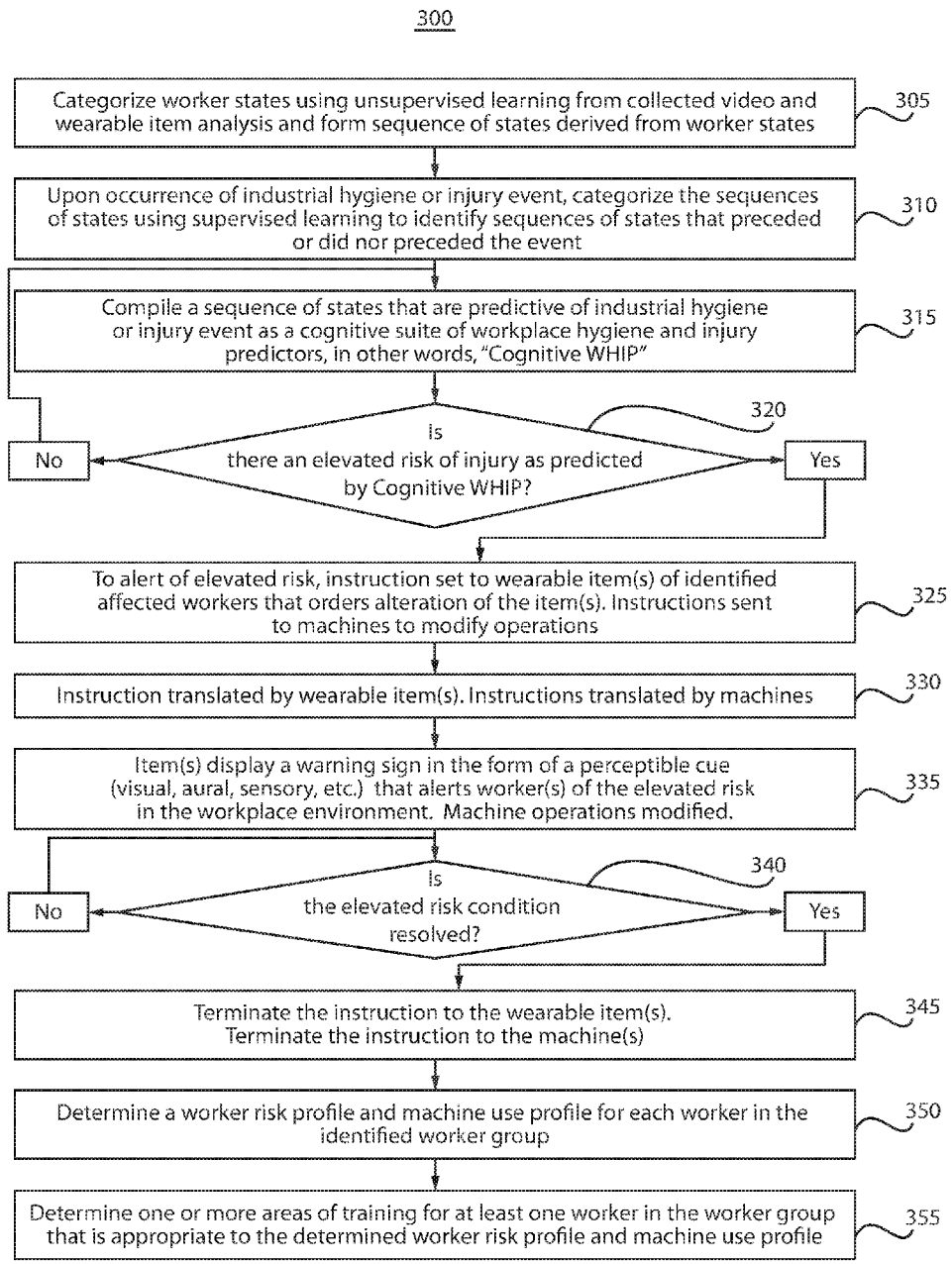
FIG. 3 shows an exemplary method of assessing risk, providing wearable indication of risk, and transmission of a signal warning the worker or workers of a possible injury risk situation, in accordance with an embodiment of the present principles.

Further, it is to be appreciated that processing system 100 may perform at least part of the method described herein including, for example, at least part of method 300 of FIG. 3. Similarly, part or all of system 200 may be used to perform at least part of method 300 of FIG. 3.

System 200 is an exemplary system for assessing risk, providing wearable indication of risk, and transmitting a signal to a worker or workers warning of an injury risk situation, in accordance with an embodiment of the present principles.

System 200 is shown with respect to an operational environment in which it can be utilized, in accordance with an embodiment of the present principles. Accordingly, a number of individual workers 291 working at machines 290 are shown. The machines are of the kind ordinarily found in the a specific workplace environment, which for example could be a factory, machine shop, assembly line, warehouse, or any other kind of workplace facility.

The individual workers 291 display wearable items 282. The wearable items can take the form of personal wearable instrumentation (e.g., smart watches, blood pressure monitors, heart rate monitors, and so forth) that measure various physical parameters of a worker. Moreover, the video data captured by video camera 282 can be also be used to collect information on various characteristics of each worker. By way of example, the information collected by the wearable item and by the video camera can include heart rate, blood pressure, physical coordination, alertness, distractedness, sleepiness, physical exhaustion, shakiness (trembling), and indicators of a worker's emotional state such as crying, smiling, laughing, outward expressions of anger and frustration, such as screaming, yelling, poor body language, and manifestations of illness such as coughing, sneezing, frequent rest, and so forth.

The system 200 includes one or more servers (hereinafter "servers") 210. Each of the servers 210 can include a processor or controller (hereinafter "controller") 210A, memory 210B, workplace hygiene and injury predictor 210C, an elevated risk determiner 210D, a worker warning manager 210E and a workplace machine manager 210F.

FIG. 2 depicts the servers 210 as being within, i.e., local, to the workplace environment, but this does not have to be the case. In another embodiment, the servers 210 can be in the cloud. In yet another embodiment, the servers can be both local and remote, such that the local servers perform some of the functions implicated by the present principles, while the remote servers perform other functions implicated by the present principles. Hence, while wired connections are shown between the video camera 281 (described in further detail herein below) and the servers 210, other connection types can be used, including wireless connections and so forth. The same applies to the wired connections between the servers 210 and the workplace machines 290, which can instead be wireless connections, and so forth. The wearable items 282, as depicted, are in wireless connection to the server. A wired connection could also be employed.

The workplace hygiene and injury predictor 210C generates predictions of workplace hygiene and injury. As indicted above, the predictions are made by injury predictor 210C based on the worker states that can include, but are not limited to, physical, cognitive, and emotional states. As also indicated above, information on the worker states are collected from the video data captured by video camera 281 and from the wearable item 282 worn by the worker. As is evident, the collected information can be indicative of stress, inattentiveness, sickness, or some other worker state or condition that could contribute to an accident that causes injury to a worker-of-interest and possibly to coworkers nearby or further down the production line. Exemplary physical states include, but are not limited to, injury, abnormal pulse rate, abnormal body temperature, abnormal blood pressure, and so forth. Exemplary cognitive states and indicators of same include, but are not limited to confusion, doubt, tiredness, distractedness, anger, sadness, frustration, to name but a few. Exemplary emotional states include, but are not limited to, sadness, excitedness, and so forth. Cognitive and emotional states are functions of measures of a user's total behavior collected over some period of time from at least one personal information collector (including musculoskeletal gestures, speech gestures, eye movements, internal physiological changes, measured by imaging devices, microphones, physiological and kinematic sensors in a high dimensional measurement space) within a lower dimensional feature space. In one embodiment, feature extraction techniques are used to identify certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive and emotional traits over that period of time.

In one embodiment, the present system tracks for the risk of injury posed by industrial hygiene issues. Industrial hygiene, for example, refers to the science and art devoted to the anticipation, recognition, evaluation, and control of those environmental factors or stresses arising in or from the workplace, which may cause sickness, impaired health and well-being, or significant discomfort among workers or among the citizens of the community. In an embodiment, the level of exposure to a harmful material employed in the workplace is tracked, for example, through a breathing monitor worn by a worker. By way of example, the harmful material may be a particulate material, such as asbestos, or it may be a chemical material, such as a volatile solvent.

In an embodiment, the predictor 210C categorizes the worker states by using unsupervised learning from video data/analysis and wearable items data/analysis, e.g., learning that has no interaction, e.g., machine learning. In an embodiment, sequences of states are formed from the worker states. The sequences of states are formed from states based on, for example, temporal state information (e.g., one state temporally follows or precedes another state, and so forth), cognitive state information (e.g., one state cognitively follows or precedes another state), and so forth. A sequence of states can be formed from different types of states.

The worker states could, for example, be physical worker states and/or cognitive worker states. For example, the states could be physical states such as motion, stillness, standing, sitting, bending, reaching, lifting, pushing, pulling, etc. A cognitive state could be concentration, focus, distractedness, alertness, etc.

In an embodiment, upon an industrial hygiene or injury event, the predictor 210C categorizes the sequences of states, for example, using supervised learning, to identify sequences of states that precede or do not precede the event, e.g., machine learning task of inferring a function from labeled training data, which could be a set of training examples. In supervised learning, each example is a pair of an input object (e.g., a vector) and a desired output value, which can be referred to as the supervisory signal.

In an embodiment, the predictor 210C compiles the sequence of states to form prediction states or predictions, with the compilation being referred to as the "Cognitive WHIP".

The elevated risk determiner 210D determines the existence of an elevated risk. In an embodiment, the determination is threshold based. For example, a subsequent risk (yet to occur) predicted by the Cognitive WHIP is compared to a threshold, where the risk is deemed very probable (very likely to occur) when the subsequent risk meets or exceeds the threshold.

The predicted risk is transmitted to items worn by the worker or workers through a set of standard interfaces. The controller 210A implements decisions made by the worker warning manager 210E. The decisions can include the sending of a signal to the wearable item 282 through a transmitter. The signal is translated by a receiver on the wearable item into a perceivable alert such as a visual alert (light), an audible alert (sound), or a tactile alert (e.g., vibration). Upon translation of the signal by the receiver on the wearable item into a perceivable alert, the worker is alerted to the risk condition.

In one embodiment, the worker is equipped with a helmet 285 as a wearable item. In another embodiment, the worker is equipped with at least two wearable items. Exemplary wearable items that can issue perceivable alerts include headgear, smart watches, smart eyewear, pressurized suits, worker uniforms and worker protective clothing. Visual alerts, sound alerts and tactile alerts can be incorporated into the wearable items. In one embodiment, helmet 285 is equipped with a visual indicator in the form of a light source 288. A helmet equipped with a light source can alert workers in line of site of the affected worker of the elevated risk condition. Furthermore, the helmet could be equipped with a speaker for communicating an alarm sound or specific verbal instructions to the worker.

In one embodiment, the light source, whether included in a helmet or included in another kind of wearable item, is an LED light source that is capable of emitting light in a plurality of colors, with the different colors designating predetermined levels of elevated risks relating to accidents, injury, and workplace hygiene. With this arrangement, the worker or workers could be alerted to the relative severity of the risk.

The preceding description is intended to merely be illustrative. Thus, one of ordinary skill in the art will contemplate various other ways for assessing the existence of elevated or probable risk an alerted the affected parties, while maintaining the spirit of the present principles.

In an embodiment, the risk is communicated to a machine 290 by a workplace machine manager 210F, for managing workplace machines during elevated risk conditions. In one embodiment, the elevated risk determiner 210D transmitted to the workplace machine manager 210F, which then takes appropriate actions, e.g., shutting down a machine or modifying its operation through the sending of instructions to the machine. In one embodiment, the instructions sent by the workplace machine manager 210F are based on the risk profile of the worker 291 operating the machine. In one embodiment, workplace machine manager 210F authorizes the machine to return to normal operation when the risk condition subsides.

The memory 210B stores data relating to the present principles including, but not limited to, the aforementioned data and data generated to perform the present principles. In the case the workplace hygiene and injury predictor 210C, the elevated risk determiner 210D, and the worker warning manager 210E are implemented as software or implemented in part in software, such software can be stored in the memory 210B. However, elements 210C, 210D, and 210E can also be implemented as least in part in hardware, including standalone devices, boards, integrated circuits, and so forth. In an embodiment, at least one of elements 210C, 210D, and 210E are implemented as application specific integrated circuits (ASICS). These and variations to the elements of system 200 are readily contemplated by one of ordinary skill in the art given the teachings of the present principles provided herein, while maintaining the spirit of the present principles.

Referring to FIG. 3, an exemplary method 300 for assessing risk, providing wearable indication of risk, and transmitting a signal to a worker or workers warning of a possible injury risk situation, in accordance with an embodiment of the present principles, is shown.

In block 305, worker states are categorized using unsupervised learning from collected video and wearables analysis and sequences of states are formed from the worker states.

In block 310, upon the occurrence of an industrial hygiene or injury event, the sequences of states using supervised learning are categorized to identify the sequences of states that precede or do not precede the event.

In block 315, sequences of states that are predictive of industrial hygiene or injury event are compiled as a cognitive suite of workplace hygiene and injury predictors, e.g., a "Cognitive WHIP".

In block 320, it is determined whether or not an elevated risk exists, by determining whether a subsequent risk (that is, a risk yet to occur) as predicted by the Cognitive WHIP meets or exceeds a threshold value. If "yes", then the method continues to block 325. Otherwise, the method returns to block 320.

In block 325, all workers who could be affected by the elevated risk condition are identified and instructions are sent to the wearable item(s) of identified affected workers that order the alteration of the item(s). The worker(s) identified in the identification performed in block 325 could be a worker whose state is responsible for the elevated risk condition and other workers who could be affected by the elevated risk condition. In an embodiment, instructions are sent to machines operated by the worker or workers to modify machine operations. Such modification instructions may include at least one of machine operation limits, further controls, and stop signals. For example, the modification instructions to the workplace machine may include shutting the machine down to prevent further injury or risk of injury. In another example, the modification instructions to the machine may restrict the machine to only a subset of the operations that the machine is capable of performing. In an embodiment, a workplace machine is shut down for a predetermined time period, and the machine resumes operation after the time period has passed. In an embodiment, for a given workplace machine, the resumed operations may be limited to a subset of operations that the machine is capable of performing. The instructions sent to the workers and/or machines could be sent through a wire connection or through a wireless connection, in accordance with present principles.

In block 330, the instruction sent in block 325 is translated by the wearable item(s) and/or machines.

In block 335, the wearable item(s) of the identified workers display a warning signal in the form of a perceivable cue, such as a visual cue (e.g., illuminated light), an audible cue (e.g., alarm, verbal instructions) or a tactile cue, such as the vibration of a wearable item. Further, machine operations are modified in accordance with the machine instructions.

In block 340, it is determined whether the risk condition is resolved. If yes, then the method proceeds to block 345. Otherwise, the method returns to block 340.

In block 345, the instruction sent to the worker and/or machine informing of the elevated risk is terminated. In an embodiment, a person (user, supervisor, etc.) sends the termination instruction. In another embodiment, a controller performing method 300 sends the termination instruction. In yet another embodiment, the termination instruction is sent after a predetermined period of time has passed.

In block 350, a worker risk profile and machine use profile for each worker who had been identified as exposed to the elevated risk is determined.

In block 355, one of more areas of training for at least one worker in the worker group is determined, based on the profiles obtained in block 350. The training areas will be appropriate to the determined worker risk profile and machine use profile for that worker. In an embodiment, the one or more areas of training are determined so as to at least one of reduce a risk threshold and increase a skill level of the at least one worker. Thereafter, at an applicable time, the worker can be trained in the determined area(s) of training.

There are several advantages the flow from implementing the present principles over conventional solutions, such as, e.g.:

(A) Workers should be able to respond better to risks in the workplace upon receiving indication that a co-worker is at risk.

(B) Intuition and additional alerting semantics can assist workers in interpreting and adjusting to certain risks identified with certain individuals.

(C) Standard interfaces to different items of clothing and protective gear can allow coordination of the risk display for maximum effectiveness.

(D) The machine usage profile and a worker's condition leading up to the elevated risk event can be reviewed in order to provide more effective training and precautionary measures in the future.

While the present disclosure includes a detailed description on cloud computing, it should be understood that implementation of the subject matter described herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
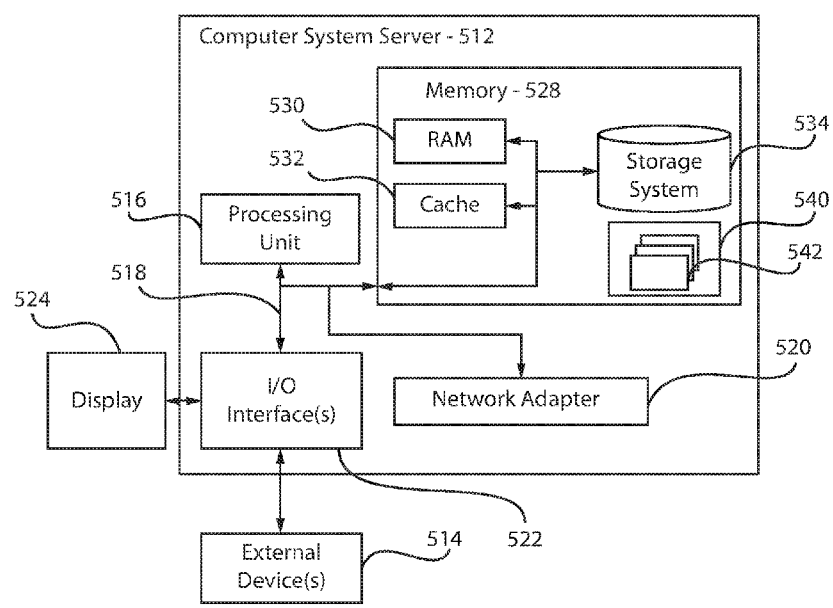
FIG. 4 shows an exemplary cloud computing node in accordance with an embodiment of the present principles.

Referring now to FIG. 4, a schematic of an example of a cloud computing node 510 is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 5:
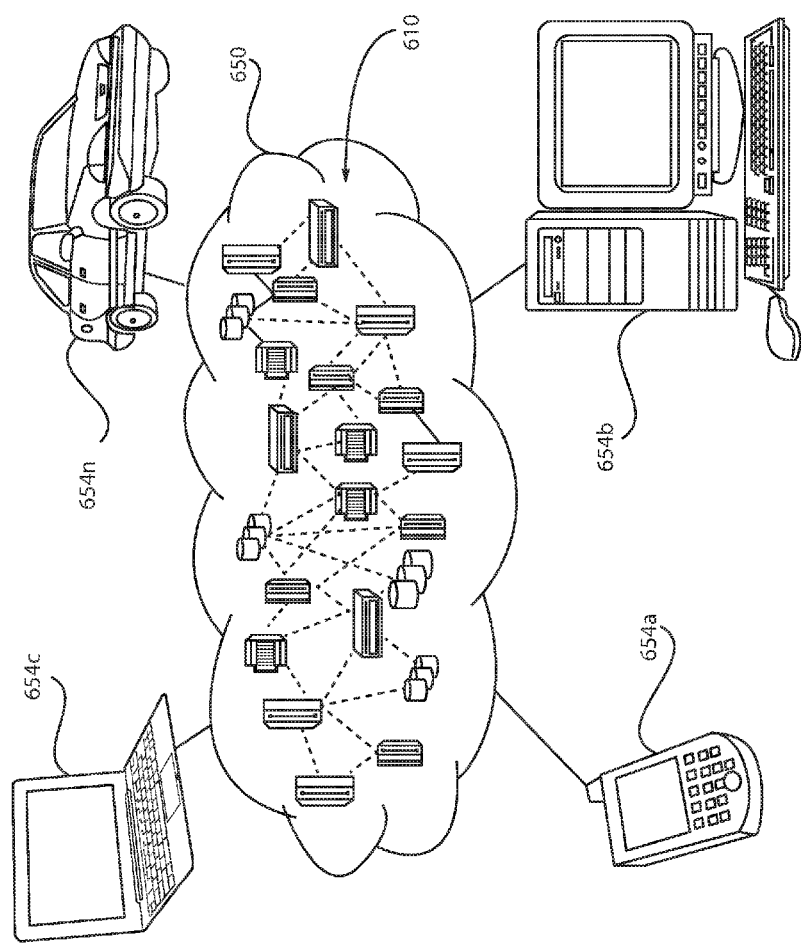
FIG. 5 shows an exemplary cloud computing environment in accordance with an embodiment of the present principles.

Referring now to FIG. 5, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 5 are intended to be illustrative only and that computing nodes 610 and cloud computing environment 650 can communicate with any type of computerized device over any type of network and/or network addressable connection (e.g., using a web browser).

Figure 6:
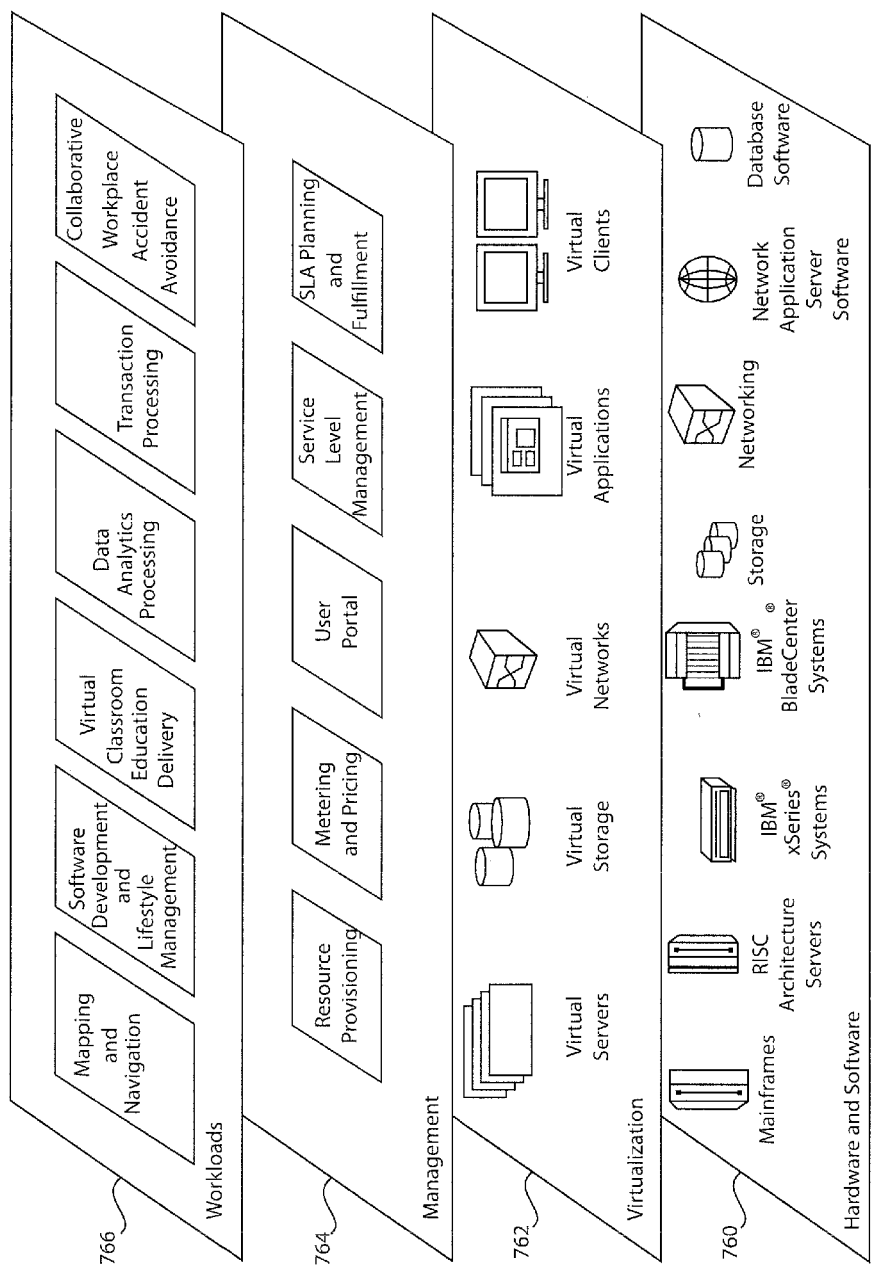
FIG. 6 shows exemplary abstraction model layers, in accordance with an embodiment of the present principles.

FIG. 6 shows a set of functional abstraction layers provided by cloud computing environment 650. It should be understood in advance that the components, layers, and functions shown in FIG. 6 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and collaborative workplace accident avoidance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for wearable indication of personal risk within a workplace, which are intended to be illustrative and not limiting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for alerting of personal risk in the workplace through a worker-wearable indicator of a risk condition, comprising:
generating, in computer memory, a set of workplace predictors of risk relating to accidents, injury, and industrial hygiene events based on at least one worker state that includes at least one of a cognitive state and an emotional state, based on collected information including at least video data, by compiling a sequence of states that are predictive of an elevated risk of an industrial hygiene or workplace injury event; and
alerting a worker endangered by a predicted elevated risk to the existence of the predicted elevated risk by sending a perceivable alert to the worker through a wearable risk indicator worn by the worker.

2. The method of claim 1 wherein the perceivable alert is issued by a perceivable alert source included in the wearable risk indicator.

3. The method of claim 1 wherein the perceivable alert is an emission from at least one of a light source, a sound source, and a vibration source included in the wearable risk indicator.

4. The method of claim 1, wherein the set of workplace predictors are generated by developing a cognitive suite of workplace hygiene and injury predictors comprising:
categorizing worker states using unsupervised learning from video data and personal wearable data collector analysis;
categorizing sequences of worker states using supervised learning to determine the sequences of worker states that predict an accident event; and
compiling the sequence of states that are predictive of an industrial hygiene or workplace injury event from the categorizing of worker states using unsupervised learning and the categorizing of sequences of worker states using supervised learning.

5. The method of claim 1, wherein a plurality of wearable risk indicators are worn by the worker, and the perceivable alert is transmitted through a set of standard interfaces provided for each wearable risk indicator according to a translation interface for each indicator.

6. The method of claim 1, further comprising communicating an instruction to a machine operated by the worker to modify machine operation as a result of the predicted elevated risk.

7. The method of claim 1, further comprising:
determining a respective worker risk profile and machine use profile for each worker in a set of workers; and
determining one or more areas of training for at least one worker in the set that is appropriate to the worker risk profile and machine use profile for the at least one worker.

8. A system for alerting of personal risk in the workplace through a worker-wearable indicator of a risk condition, comprising:
one or more servers having a processor;
a workplace hygiene and injury predictor, for predicting a risk of accidents, injury, and industrial hygiene events in the workplace through consideration of categorized information on worker states, including at least one of a cognitive state and an emotional state, based on collected information including at least video data, obtained by unsupervised learning and supervised learning;
an elevated risk determiner, for determining the existence of a predicted risk of an accident, injury, and industrial hygiene event;
a worker warning manager, for transmitting a signal directed to a worker exposed to a predicted elevated risk; and
a wearable risk indicator worn by the worker, for translating the signal into a perceivable alert.

9. The system of claim 8, wherein the workplace hygiene and injury predictor further comprises a compiler, for compiling a cognitive suite of workplace hygiene and injury predictors generated by:
categorizing worker states using unsupervised learning from video data and personal wearable instrumentation analysis;
categorizing sequences of worker states using supervised learning to determine the corresponding sequences of worker states that predict an accident event; and
compiling the sequence of states that are predictive of an industrial hygiene or workplace injury event from the categorizing of worker states using unsupervised learning and the categorizing of sequences of worker states using supervised learning.

10. The system of claim 8, further comprised of a video data collector and a worker personal information collector, for collecting information on worker states.

11. The system of claim 8, wherein the wearable risk indicator worn by the worker further comprises a worker personal information collector.

12. The system of claim 8, further comprising a workplace machine manager, for modifying the operation of a workplace machine during a predicted elevated risk condition.

13. The system of claim 8, wherein the wearable risk indicator worn by the worker is comprised of a perceivable alert source that is at least one of a light source, a sound source, and a vibration source, from which source the perceivable alert is provided to the worker.

14. The system of claim 13, wherein the light source is a LED light source that emits light in a plurality of colors that designate predetermined levels of elevated risks relating to accidents, injury, and workplace hygiene.

15. A computer program product alerting of personal risk in the workplace through a worker-wearable indicator of a risk condition, the computer program product comprising a non-transitory computer readable storage medium having program instructions embodied therewith, the program instructions executable by a computer to cause the computer to perform a method comprising:

generating a set of workplace predictors of risk relating to accidents, injury, and industrial hygiene, based on at least one worker state that includes at least one of a cognitive state and an emotional state, based on collected information including at least video data, by compiling a sequence of states that are predictive of an industrial hygiene or workplace injury event; and alerting a worker endangered by a predicted elevated risk to the existence of the predicted elevated risk by sending a perceivable alert to the worker through a wearable risk indicator worn by the worker.

16. The computer program product of claim 15, wherein the program instructions executable by a computer cause the computer to perform the method that includes sending the perceivable alert to the worker through a perceivable alert source included in the wearable risk indicator worn by the worker.

17. The computer program product of claim 15, wherein the program instructions executable by a computer cause the computer to perform the method that includes activating at least one of a light source, a sound source, and a vibration source included in the wearable risk indicator as a perceivable alert source.

18. The computer program product of claim 15, wherein the program instructions executable by a computer cause the computer to perform the method that includes generating a set of workplace predictors by:

categorizing worker states using unsupervised learning from video data and personal wearable instrumentation analysis;

categorizing sequences of worker states using supervised learning to determine the corresponding sequences of worker states that predict an accident event; and compiling the sequence of states that are predictive of an industrial hygiene or workplace injury event from the categorizing of worker states using unsupervised learning and the categorizing of sequences of worker states using supervised learning.

19. The computer program product of claim 15, wherein the program instructions executable by a computer cause the computer to perform the method that includes transmitting a perceivable alert of a predicted elevated risk to a plurality of wearable risk indicators that are worn by the worker, the perceivable alert being transmitted through a set of standard interfaces provided for each wearable risk indicator according to a translation interface for each indicator.

20. The computer program product of claim 15, wherein the program instructions executable by a computer further comprise communicating an instruction to a machine operated by the worker to modify machine operation as a result of the predicted elevated risk.

* * * * *